(12) United States Patent
Tsuchiya

(10) Patent No.: US 10,567,667 B2
(45) Date of Patent: Feb. 18, 2020

(54) IMAGE PICKUP APPARATUS CAPABLE OF PERFORMING INTERMITTENT PHOTOGRAPHY, METHOD OF CONTROLLING SAME, AND STORAGE MEDIUM

(71) Applicant: CANON KABUSHIKI KAISHA, Tokyo (JP)

(72) Inventor: Takuo Tsuchiya, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/963,604

(22) Filed: Apr. 26, 2018

(65) Prior Publication Data

US 2018/0316841 A1   Nov. 1, 2018

(30) Foreign Application Priority Data

Apr. 28, 2017 (JP) ................................ 2017-089677

(51) Int. Cl.
| | |
|---|---|
| H04N 5/235 | (2006.01) |
| H04N 5/243 | (2006.01) |
| H04N 5/232 | (2006.01) |
| H04N 5/238 | (2006.01) |
| H04N 5/262 | (2006.01) |

(52) U.S. Cl.
CPC .......... *H04N 5/2352* (2013.01); *H04N 5/238* (2013.01); *H04N 5/2353* (2013.01); *H04N 5/2357* (2013.01); *H04N 5/23245* (2013.01); *H04N 5/243* (2013.01); *H04N 5/2356* (2013.01); *H04N 5/2625* (2013.01)

(58) Field of Classification Search
None
See application file for complete search history.

(56) References Cited

U.S. PATENT DOCUMENTS

| | | | | |
|---|---|---|---|---|
| 8,515,270 | B1 * | 8/2013 | Posehn | G03B 15/00 |
| | | | | 396/48 |
| 2015/0350544 | A1 * | 12/2015 | Williams | H04N 5/23245 |
| | | | | 348/239 |

FOREIGN PATENT DOCUMENTS

JP        2015139029 A      7/2015

* cited by examiner

*Primary Examiner* — James M Hannett
(74) *Attorney, Agent, or Firm* — Rossi, Kimms & McDowell LLP

(57) ABSTRACT

An image pickup apparatus capable of performing intermittent photography while suppressing unnatural changes in degree of blur of an object. The image pickup apparatus obtains a plurality of images by causing an image pickup section to intermittently photograph an object at predetermined time intervals. One of photography modes is selected according to the object, exposure control values to be used in photographing by the image pickup section are determined based on the selected photography mode, and exposure control is performed according to the determined exposure control values. When the selected photography mode in first photographing is a first photography mode in which an aperture value as one of the exposure control values is variable, the other exposure control values in second photographing performed after the first photographing are determined by using the aperture value determined in the first photographing.

7 Claims, 13 Drawing Sheets

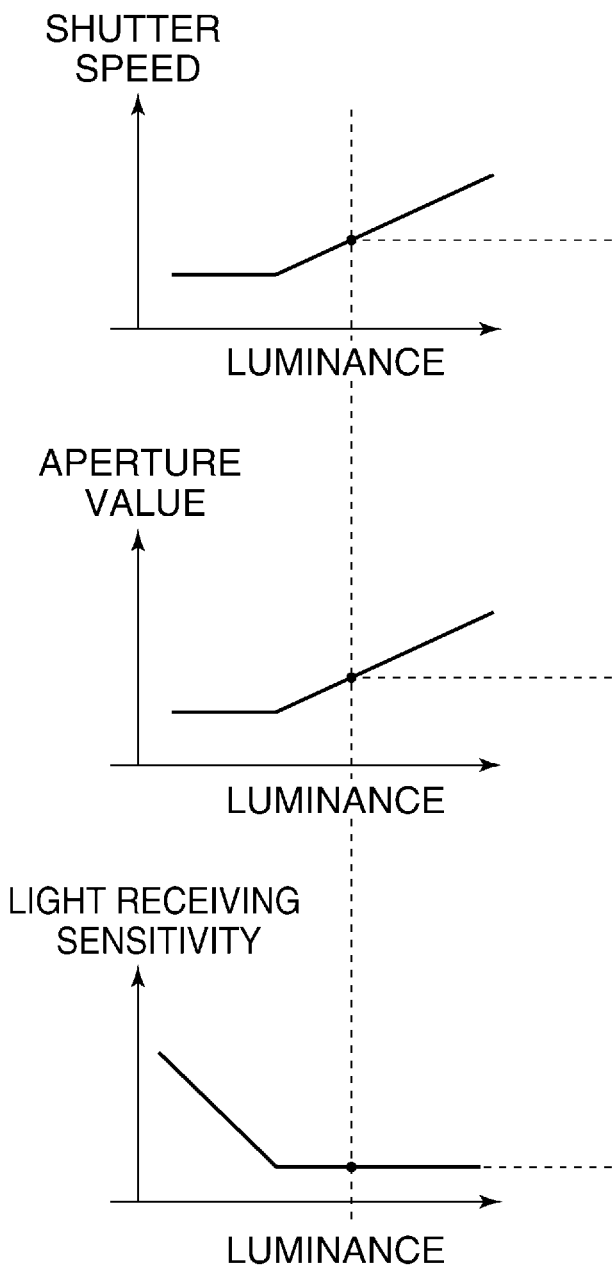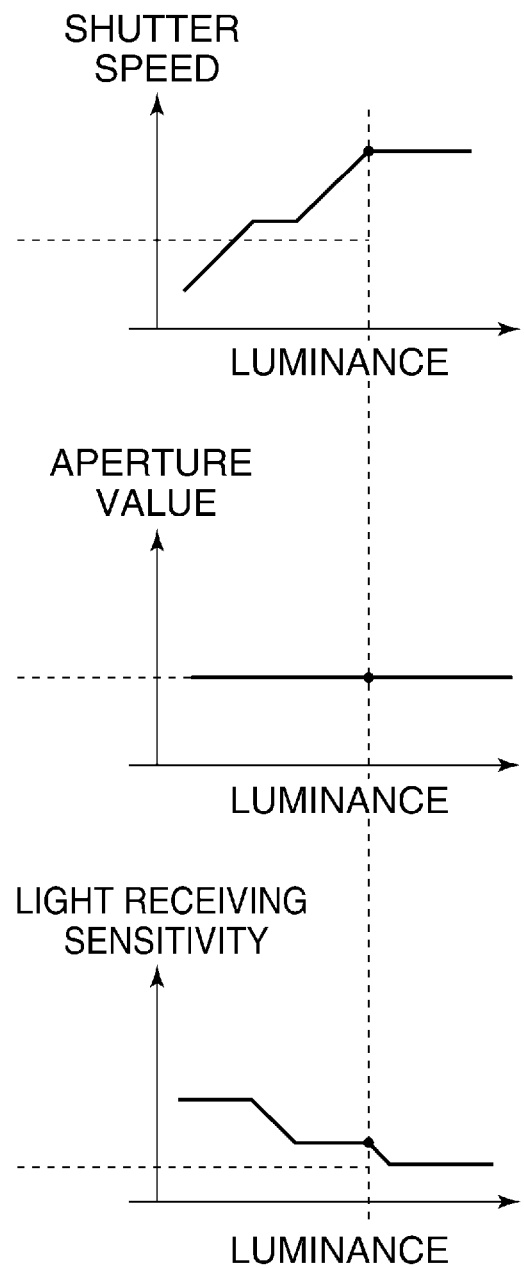

FIG. 11
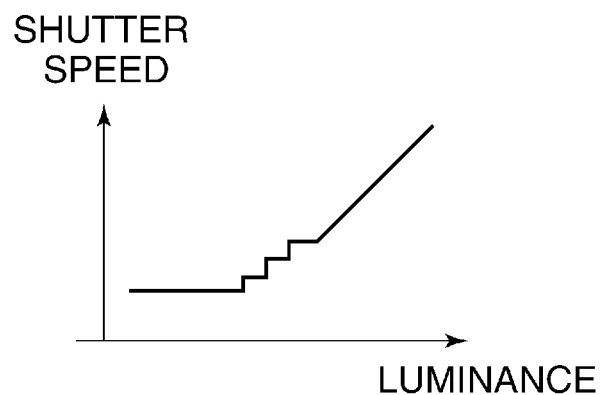
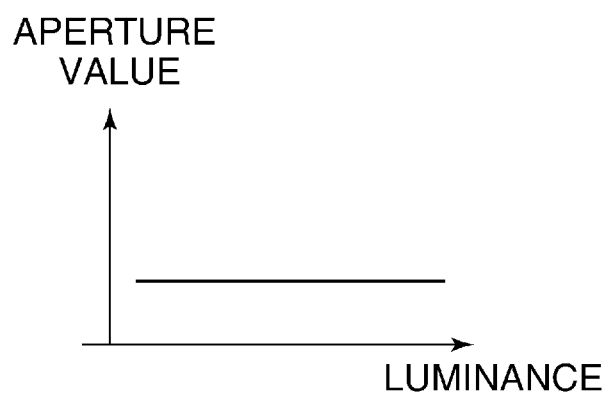
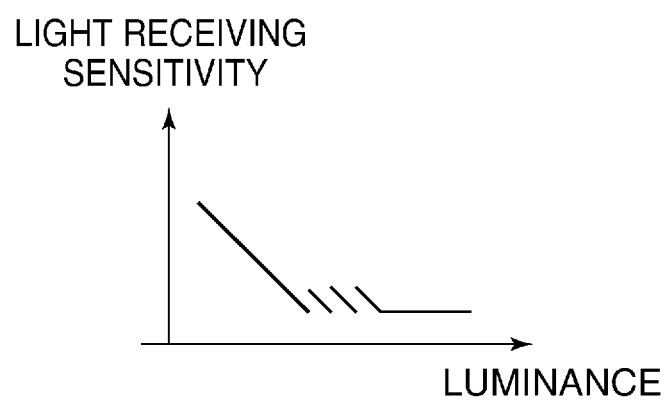

IMAGE PICKUP APPARATUS CAPABLE OF PERFORMING INTERMITTENT PHOTOGRAPHY, METHOD OF CONTROLLING SAME, AND STORAGE MEDIUM

BACKGROUND OF THE INVENTION

Field of the Invention

The present invention relates to an image pickup apparatus capable of performing intermittent photography, a method of controlling the same, and a storage medium, and more particularly to exposure control performed in intermittent photography.

Description of the Related Art

In general, an image pickup apparatus, such as a digital single-lens reflex camera, has a plurality of photography modes in which exposure control values are determined according to a state of an object, and sets an optimum exposure condition for photographing an object, on a photography mode basis.

For example, when photographing a person, the image pickup apparatus is set to a photography mode in which an aperture value is controlled to a closed side, and when photographing a scenery, it is set to a photography mode in which the aperture value is controlled toward an open side. This makes it possible to determine an optimum exposure condition (exposure control values) according to a state (condition) of an object.

On the other hand, photography (so-called time-lapse photography) is known in which an object is intermittently photographed at predetermined time intervals and a plurality of images obtained through this intermittent photography are sequentially connected to generate a moving image with compressed temporal changes (so-called time-lapse moving image).

In general, in the time-lapse photography, the photography interval can be set in seconds or minutes. Therefore, a degree of change in luminance of an object is different depending on a difference in photography interval, and hence it is necessary to perform exposure control so as not to generate unnatural changes in brightness in a time-lapse moving image.

For example, there is a method in which second-time and subsequent photographing operations are performed in a state holding the exposure control values set when a first-time photographing operation was performed. However, the exposure control values are fixed in this method, and hence it is impossible to set a proper brightness according to a change in luminance of an object for each intermittent photography operation.

To solve this problem, exposure control is performed such that a predetermined hysteresis is set in accordance with changes in luminance, and the exposure control values are set based on the hysteresis (see e.g. Japanese Laid-Open Patent Publication (Kokai) No. 2015-139029). According to Japanese Laid-Open Patent Publication (Kokai) No. 2015-139029, it is possible to perform exposure control in accordance with changes in luminance of an object while suppressing degradation of the quality of a moving image.

Incidentally, a change in the aperture value as one of the exposure control values causes a change in the depth of field, and hence a degree of blur of an object in an image changes according to a set aperture value. In Japanese Laid-Open Patent Publication (Kokai) No. 2015-139029, however, influence of the aperture is not taken into consideration, and hence the aperture value is sometimes changed according to a change in luminance of an object.

Time-lapse photography performed in such a state produces an unnatural moving image having frames which are different in degree of blur of the object.

SUMMARY OF THE INVENTION

The present invention provides an image pickup apparatus that is capable of performing intermittent photography which makes it possible to suppress unnatural changes in degree of blur of an object when generating a moving image based on images obtained through intermittent photography, a method of controlling the same, and a storage medium.

In a first aspect of the present invention, there is provided an image pickup apparatus that obtains a plurality of images by causing an image pickup section to intermittently photograph an object at predetermined time intervals, comprising at least one processor to perform, selecting one of a plurality of photography modes according to the object, and determining exposure control values to be used in photographing performed by the image pickup section, based on a selected photography mode, and performing exposure control according to the determined exposure control values, wherein in a case where, when performing first photographing, the selected photography mode is a first photography mode in which an aperture value as one of the exposure control values is variable, the at least one processor determines, by using an aperture value determined in the first photographing, the other exposure control values in second photographing performed after the first photographing.

In a second aspect of the present invention, there is provided a method of controlling an image pickup apparatus that obtains a plurality of images by causing an image pickup section to intermittently photograph an object at predetermined time intervals, comprising selecting one of a plurality of photography modes according to the object, and determining exposure control values to be used in photographing performed by the image pickup section, based on a selected photography mode by said selecting, and performing exposure control according to the determined exposure control values, wherein the exposure control includes, in a case where, when performing first photographing, a photography mode selected by said selecting is a first photography mode in which an aperture value as one of the exposure control values is variable, determining, by using an aperture value determined in the first photographing, the other exposure control values in second photographing performed after the first photographing.

In a third aspect of the present invention, there is provided a non-transitory computer-readable storage medium storing a computer-executable program for executing a method of controlling an image pickup apparatus that obtains a plurality of images by controlling an image pickup section to intermittently photograph an object at predetermined time intervals, wherein the method comprises selecting one of a plurality of photography modes according to the object, and determining exposure control values to be used in photographing performed by the image pickup section, based on a selected photography mode by said selecting, and performing exposure control according to the determined exposure control values, wherein the exposure control includes, in a case where, when performing first photographing, a photography mode selected by said selecting is a first photography mode in which an aperture value as one of the exposure control values is variable, determining, by using an aperture value determined in the first photographing, the other exposure control values in second photographing performed after the first photographing.

According to the present invention, when generating a moving image based on images obtained through intermittent photography, it is possible to suppress unnatural changes in degree of blur of an object.

Further features of the present invention will become apparent from the following description of exemplary embodiments (with reference to the attached drawings).

BRIEF DESCRIPTION OF THE DRAWINGS

FIGS. 7A and 7B are diagrams useful in explaining an example of the exposure control values determined when the aperture value is made variable in a first-time photographing operation, and is fixed in a second-time photographing operation.

FIG. 11 is a diagram showing another example of the exposure control values determined when flicker correction is performed in an aperture value-fixed photography mode.

DESCRIPTION OF THE EMBODIMENTS

The present invention will now be described in detail below with reference to the accompanying drawings showing embodiments thereof.

Figure 1A:
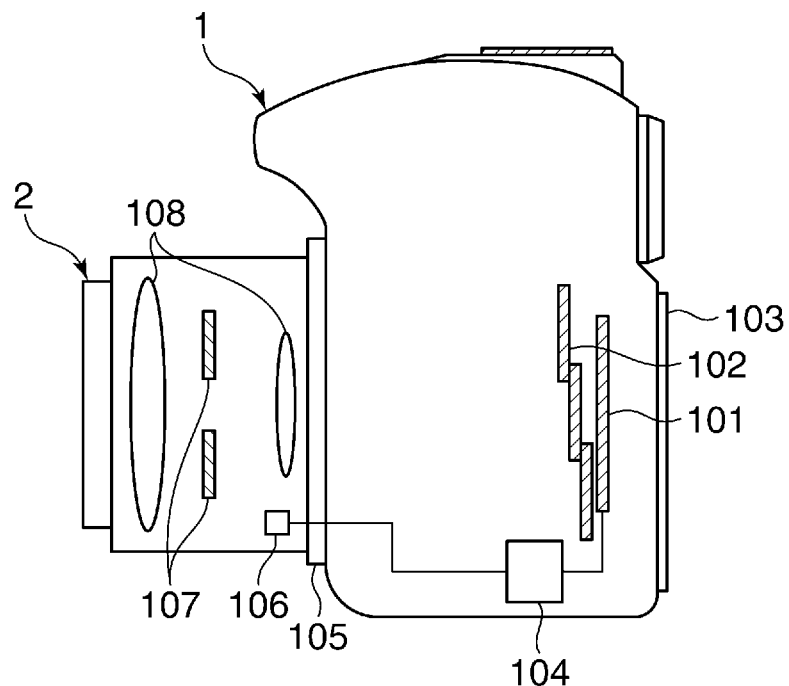
FIG. 1A is a schematic cross-sectional view of a digital camera as an image pickup apparatus according to a first embodiment of the present invention.
Figure 1B:
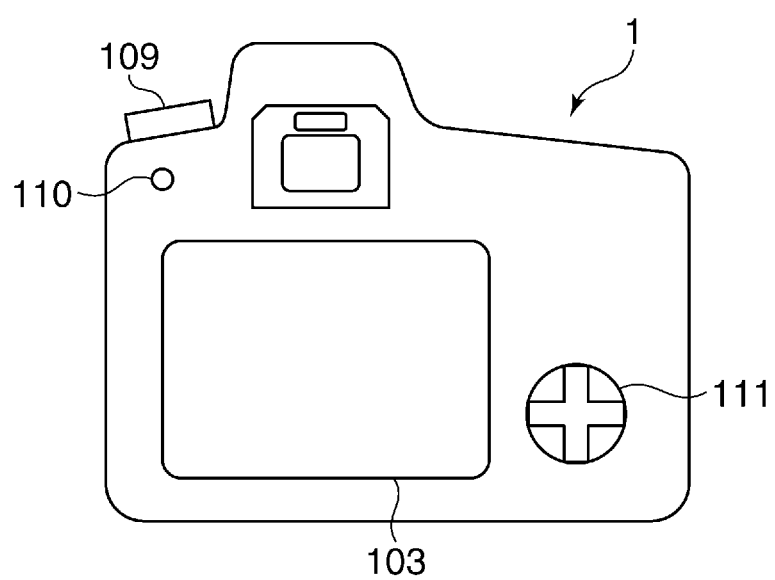
FIG. 1B is a schematic rear view of the digital camera shown in FIG. 1A.

FIGS. 1A and 1B are a schematic cross-sectional view and a schematic rear view of a digital camera as an image pickup apparatus according to a first embodiment of the present invention.

The illustrated image pickup apparatus is e.g. a digital camera (hereinafter simply referred to as the camera), and includes a camera body (image pickup apparatus body) 1 and a photographing lens unit (hereinafter simply referred to as the photographing lens) 2. The camera body 1 and the photographing lens 2 are connected via a mount contact 105, and the photographing lens 2 is an interchangeable lens. Although in the present embodiment, the description is given of an image pickup apparatus of a so-called lens-interchangeable type, which can attach and remove the photographing lens 2 to and from the camera body 1, this is not limitative. For example, an image pickup apparatus of a so-called lens-integrated type, in which the camera body and the photographing lens are integrally provided, may be employed.

The photographing lens 2 forms an object image (optical image) on an image pickup device 101 included in the camera body 1 through a lens group 108.

The image pickup device 101 outputs image signals corresponding to the optical image. The image pickup device 101 is capable of changing a sensitivity to light (light receiving sensitivity) with which light is received to form an optical image for conversion into image signals, and adjusting the amount of received light by the light receiving sensitivity.

A shutter 102 is disposed on a front side of the image pickup device 101, and an optical image is passed or blocked by changing a state of the shutter 102 by traveling of the shutter 102 (i.e. opening or closing of the shutter 102). Further, the amount of light reaching the image pickup device 101 can be adjusted according to the traveling speed of the shutter (shutter speed).

The photographing lens 2 is provided with a photographing lens controller (hereinafter simply referred to as the lens controller) 106, and the lens controller 106 changes the light amount by adjusting the aperture amount of a diaphragm 107, as described hereinafter. Further, the lens controller 106 moves the lens group 108 along an optical axis to thereby change an imaging state of the image pickup device 101.

The camera body 1 is provided with a camera controller (image pickup apparatus controller) 104, and the image pickup apparatus controller 104 and the lens controller 106 are electrically connected to each other via the mount contact 105. Further, the image pickup apparatus controller 104 controls the lens controller 106 to control the diaphragm 107 and the lens group 108.

The image pickup apparatus controller 104 determines an aperture value (aperture amount) of the diaphragm 107, a speed of the shutter 102, and an amount of light received by the image pickup device 101 (light receiving amount), i.e. the light receiving sensitivity, as described hereinafter. Here, the aperture value, the shutter speed, and the light receiving sensitivity are adjustment amounts, and these adjustment amounts are also referred to as the exposure control values.

A display section 103 is provided on the camera body 1, and displays an image obtained through photographing. Further, the display section 103 displays the exposure control values set by the image pickup apparatus controller 104.

One of photography modes of the camera is selected by a photography mode selection section 109. Here, the photography modes are modes related to the settings of the exposure control values, and for example, the photography modes include one (aperture value-fixed photography mode) in which the aperture value is fixed and the other exposure control values are determined in the fixed state of the aperture value.

Further, the photography modes include one in which a person or a moving body is detected and the optimum exposure control values are determined according to detection results. Then, the image pickup apparatus controller 104 controls the camera according to a photography mode selected by the photography mode selection section 109.

A display instruction section 110 is used when a user instructs the display of the current settings of the camera. In the present embodiment, the current settings of the camera are displayed on the display section 103 according to a user's operation of the display instruction section 110.

An operation section 111 is used when the user inputs various instructions to the image pickup apparatus controller 104. Particularly, the operation section 111 is used when the user changes the current settings displayed on the display section 103.

Figure 2:
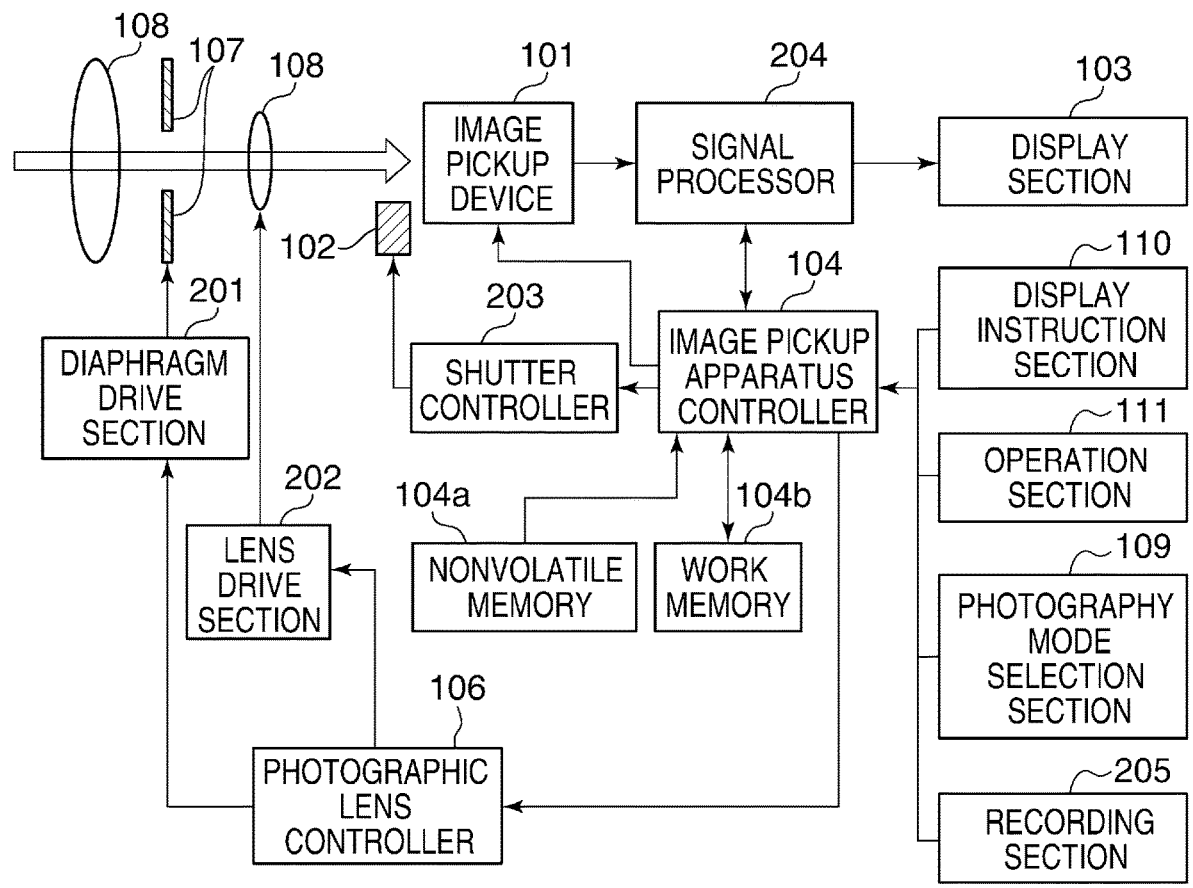
FIG. 2 is a block diagram of the digital camera shown in FIG. 1.

FIG. 2 is a block diagram of the camera shown in FIG. 1. The same components in FIG. 2 as those in FIG. 1 are denoted by the same reference numerals, and description thereof is omitted.

As shown in FIG. 2, the photographing lens 2 includes a diaphragm drive section 201 and a lens drive section 202. The diaphragm drive section 201 drives the diaphragm 107 to an aperture position instructed by the lens controller 106. The lens drive section 202 drives the lens group 108 to a position instructed by the lens controller 106.

A shutter controller 203 controls the open/closed state of the shutter 102. The shutter controller 203 drives the shutter 102 according to a speed and a time designated by the image pickup apparatus controller 104 to thereby control the exposure time of the image pickup device 101.

A signal processor 204 performs predetermined processing on image signals output from the image pickup device 101 to thereby generate image data. Then, the signal processor 204 sends the generated image data to the image pickup apparatus controller 104, and sends the same to the display section 103 to display the image data as an image.

Note that the photographing lens 2, the shutter 102, the image pickup device 101, the signal processor 204, and so forth form an image pickup section.

The image pickup apparatus controller 104 records the image data in a recording section 205. Here, the image pickup apparatus controller 104 records the image data in the recording section 205 as a still image or a moving image.

The image pickup apparatus controller 104 controls the image pickup device 101 to perform so-called time-lapse photography in which image signals are output from the image pickup device 101 at predetermined time intervals, and image data is recorded in the recording section 205 as a moving image. The time-lapse photography is photography for intermittently photographing an object using the image pickup device 101.

Note that a moving image obtained through time-lapse photography is a moving image which has a large difference between a photographing time period and a reproduction time period, compared with a normal moving image, and makes it possible to express temporal changes in the image of an object in a compressed state. For example, in a normal moving image, the total photographing time period for acquiring the moving image is substantially the same as the reproduction time period of the acquired moving image. However, in a time-lapse moving image, the temporal changes in the image of an object are compressed, and hence the reproduction time period is shorter than the total photographing time period. That is, when comparison is made between the normal moving image and the time-lapse moving image, which are the same in reproduction time period, it takes a longer total photographing time period to acquire the time-lapse moving image.

As shown in FIG. 2, a nonvolatile memory (such as a ROM) 104a and a work memory 104b are connected to the image pickup apparatus controller 104. The image pickup apparatus controller 104 controls the camera, by loading programs stored in the nonvolatile memory 104a into the work memory 104b and executing the programs. Note that the work memory 104b is also used as a work area for the image pickup apparatus controller 104.

Figure 3:
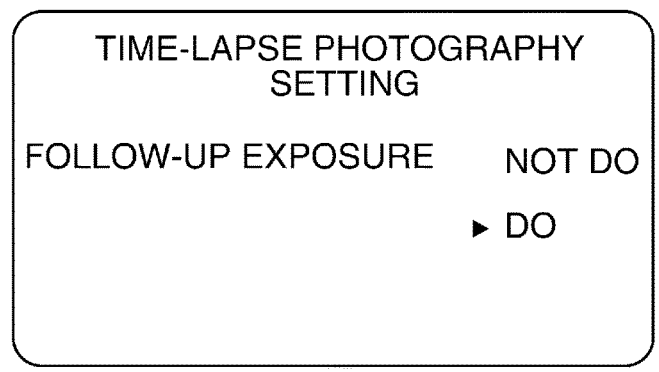
FIG. 3 is a view showing an example of a setting screen displayed on a display section appearing in FIG. 2.

FIG. 3 is a view showing an example of a setting screen displayed on the display section 103, appearing in FIG. 2. Note that the illustrated setting screen is a screen for selecting whether or not to perform exposure follow-up i.e. change the exposure value so as to follow up changes in luminance, in time-lapse photography.

The user can set whether or not to perform the exposure follow-up when making settings of the time-lapse photography by displaying the setting screen on the display section 103, and using the operation section 111. If "not do follow-up exposure" is selected, the image pickup apparatus controller 104 continues photographing without changing the exposure value even when an object luminance is changed during the time-lapse photography.

On the other hand, if "do follow-up exposure" is selected, the image pickup apparatus controller 104 changes the exposure value when an object luminance is changed during the time-lapse photography, and then continues photographing.

Figure 4A:
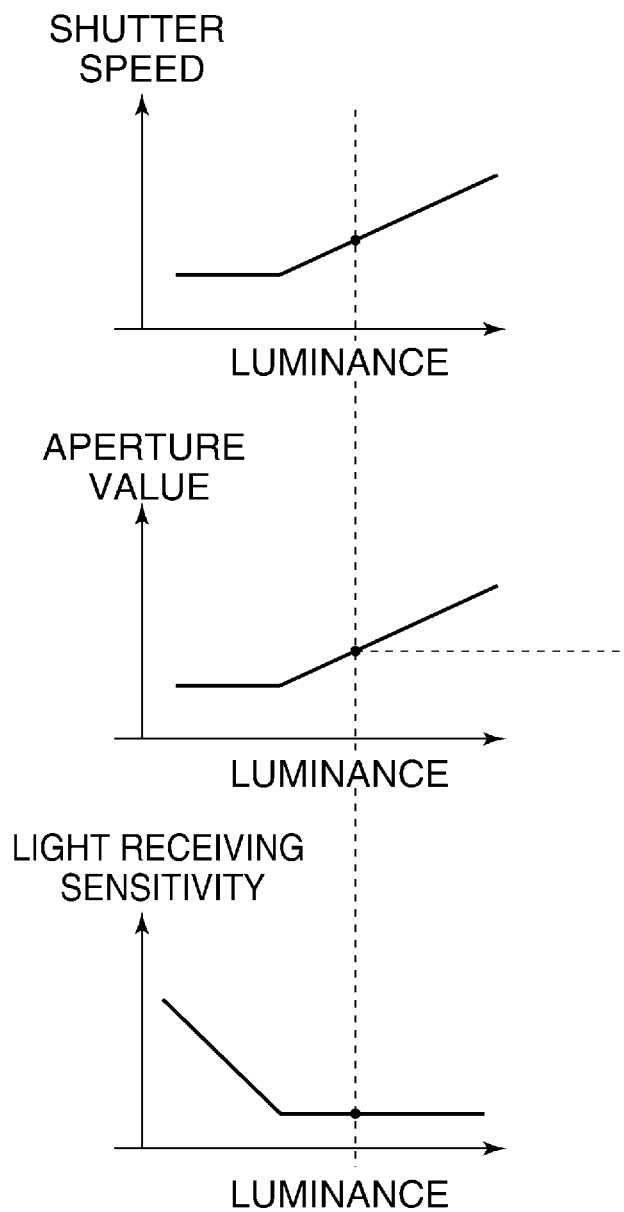
FIGS. 4A and 4B are diagrams useful in explaining an example of exposure control values determined when time-lapse photography is performed in a state in which an aperture value is made variable.
Figure 4B:
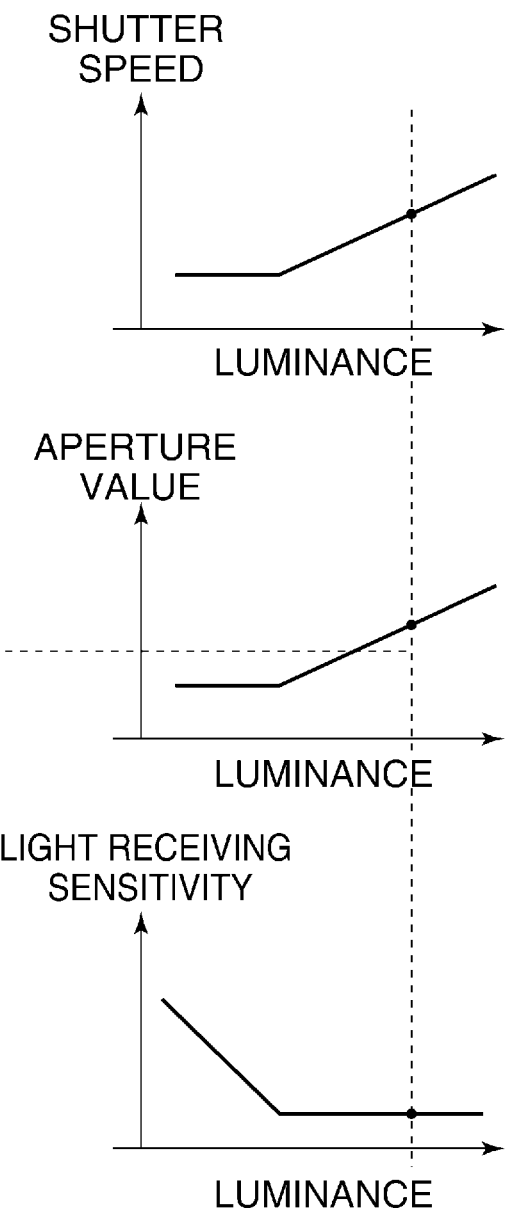

FIGS. 4A and 4B are diagrams useful in explaining an example of the exposure control values determined in the time-lapse photography performed in a state in which the aperture value is made variable. FIG. 4A shows the exposure control values determined in a first-time photographing operation, and FIG. 4B shows the exposure control values determined in a second-time photographing operation.

Now, when "do follow-up exposure" is selected in the time-lapse photography setting, the exposure control values are determined in first photographing (e.g. a first-time photographing operation) in a series of photographing operations of time-lapse photography, and then the photographing operation is performed. Then, when the exposure control values are determined in second photographing (e.g. a second-time photographing operation) after the above-mentioned first photographing in the series of photographing operations of time-lapse photography, if the aperture value is different from that in the first-time photographing operation, this causes a change in the degree of blur between a first image obtained by the first-time photographing operation and a second image obtained by the second-time photographing operation, which makes it difficult to view the images as a moving image (time-lapse moving image).

For example, as shown in FIG. 4A, even when the exposure control values are determined in the first-time photographing operation, the aperture value is changed according to a change in luminance (see FIG. 4B). Thus, whenever the luminance changes, a degree of blur changes, which may make it difficult to obtain a moving image as intended by the user.

To avoid such a situation, in the present embodiment, photographing is performed with a fixed aperture value in the second-time and subsequent photographing operations.

Figure 5A:
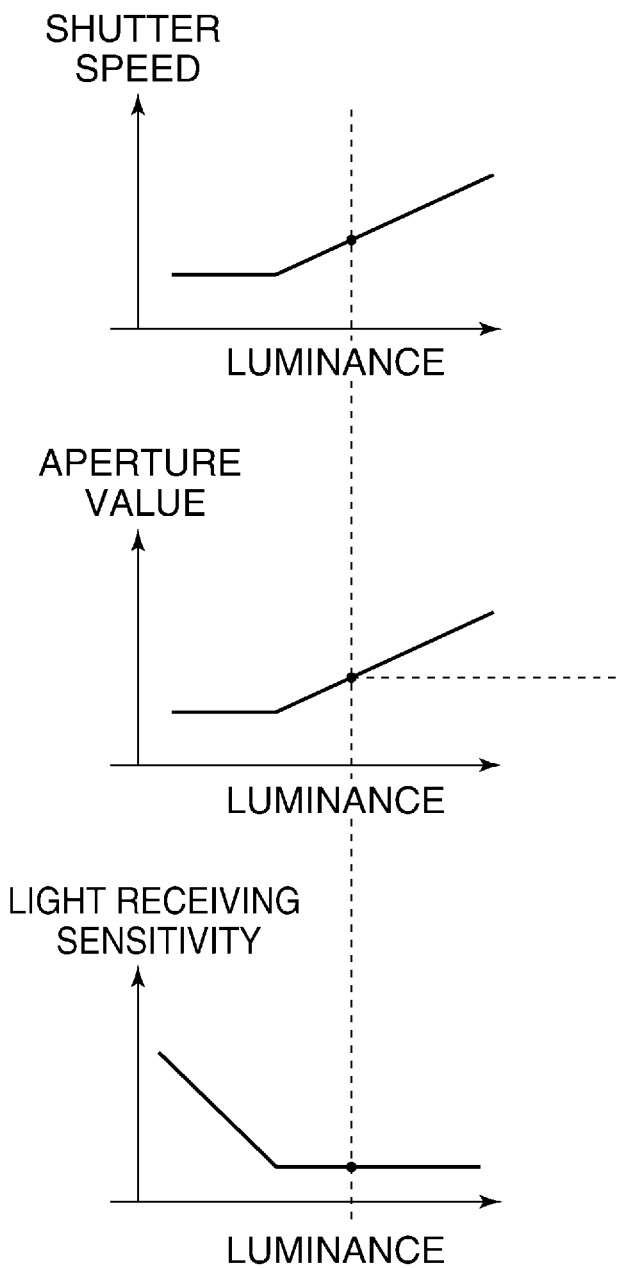
FIGS. 5A and 5B are diagrams useful in explaining an example of the exposure control values determined in time-lapse photography performed by the digital camera shown in FIG. 2.
Figure 5B:
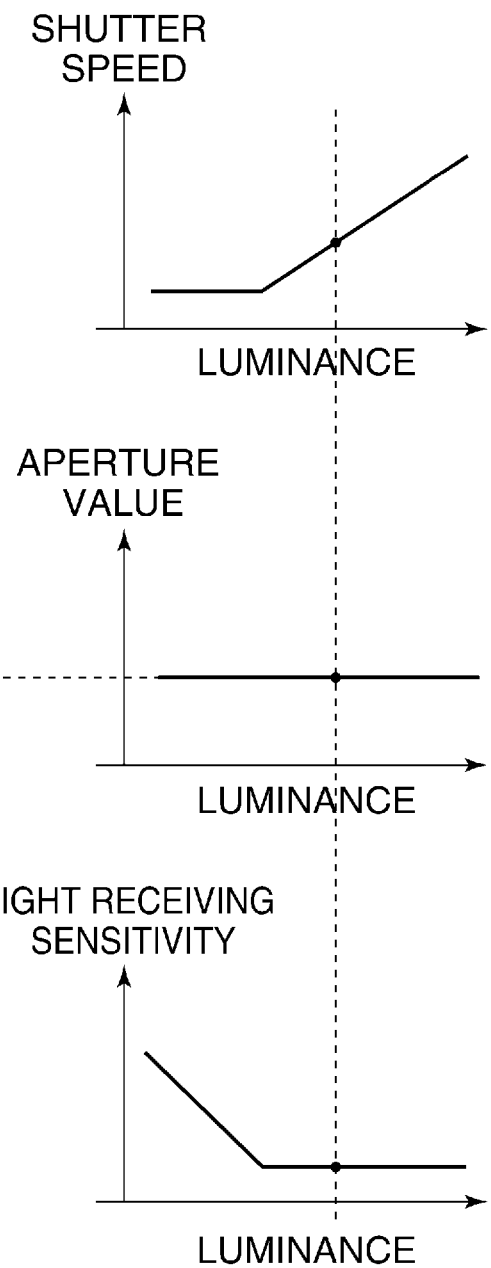

FIGS. 5A and 5B are diagrams useful in explaining an example of the exposure control values determined in the time-lapse photography performed by the camera, shown in FIG. 2. FIG. 5A shows the exposure control values determined in the first-time photographing operation, and FIG. 5B shows the exposure control values determined in the second-time photographing operation.

In the illustrated example, it is assumed that the first-time photographing operation is performed with a variable aperture value as shown in FIG. 5A, and the second photographing is performed with a fixed aperture value as shown in FIG. 5B. In the present example, in the second photographing, the aperture value is fixed to the aperture value determined in the first-time photographing operation. In other words, the aperture value in the aperture value-fixed photography mode is changed according to the aperture value determined in the first-time photographing operation.

As described above, in the first embodiment of the present invention, the aperture value of the exposure control values in the second-time and subsequent photographing operations is fixed to the aperture value determined in the first-time photographing operation. This makes it possible to reduce a feeling of strangeness caused by changes in degree of blur while making use of the features of the photography mode selected by the photography mode selection section 109.

Next, a description will be given of a camera as an image pickup apparatus according to a second embodiment of the present invention. Note that this camera has the same configuration as that of the camera shown in FIGS. 1 and 2, and hence description thereof is omitted.

Figure 6:
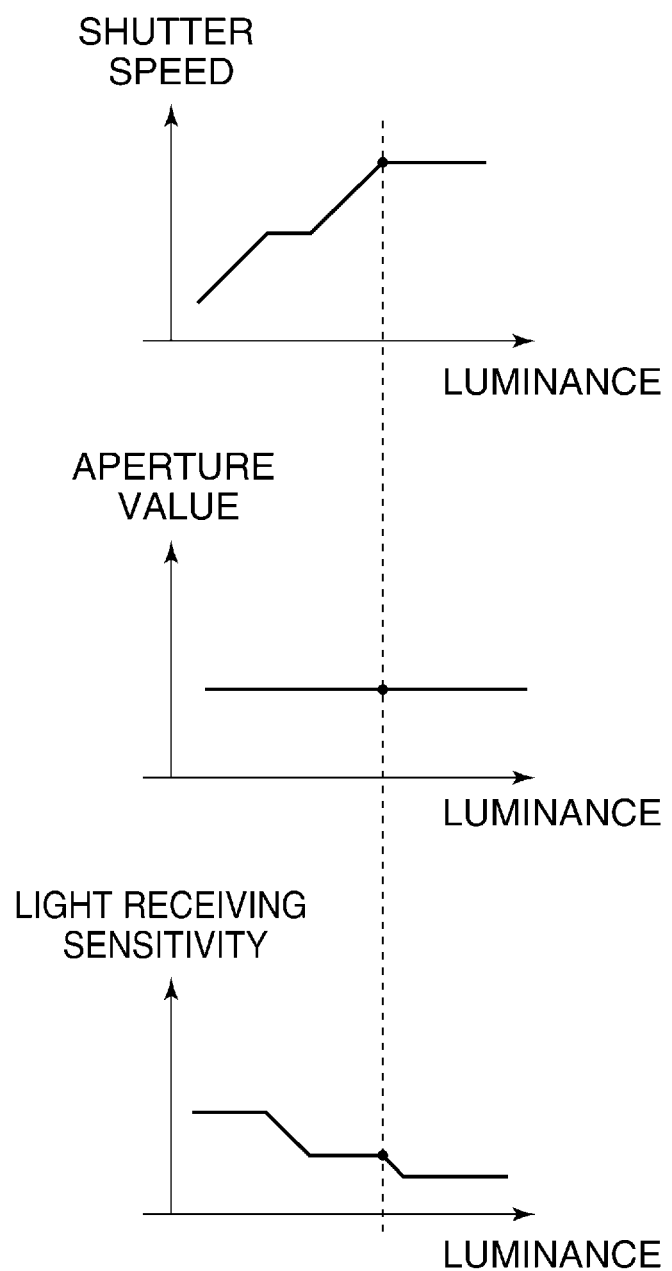
FIG. 6 is a diagram showing an example of changes in the other exposure control values in time-lapse photography performed in a state in which the aperture value is fixed.

FIG. 6 is a diagram showing an example of changes in the other exposure control values in the time-lapse photography performed in a state in which the aperture value is fixed.

Further, FIGS. 7A and 7B are diagrams useful in explaining an example of the exposure control values determined when the aperture value is made variable in first photographing (e.g. a first-time photographing operation) in a series of photographing operations of time-lapse photography, and is fixed in second photographing (e.g. a second-time photographing operation) after the first photographing in the series of photographing operations of time-lapse photography. FIG. 7A shows the exposure control values determined in the first-time photographing operation, and FIG. 7B shows the exposure control values determined in the second-time photographing operation.

Now, let it be assumed that the other exposure control values are changed as shown in FIG. 6 in photographing with a fixed aperture value. Here, let it be also assumed that in the first-time photographing operation, the exposure control values are set as shown in FIG. 7A, and in the second-time photographing operation, the exposure control values including the fixed aperture value are set as shown in FIG. 7B. In this case, continuity of the exposure control values is lost. That is, even when the same aperture value is used for the same luminance value, the shutter speed and the light receiving sensitivity are different in the second-time photographing operation from those in the first-time photographing operation.

In such a state, the continuity of a moving image is not secured, and further, the exposure control values displayed on the display section 103 are switched immediately after the first photographing, which gives the user a feeling of strangeness. To avoid such a situation, in the present embodiment, the exposure control values are determined in the following manner.

Figure 8:
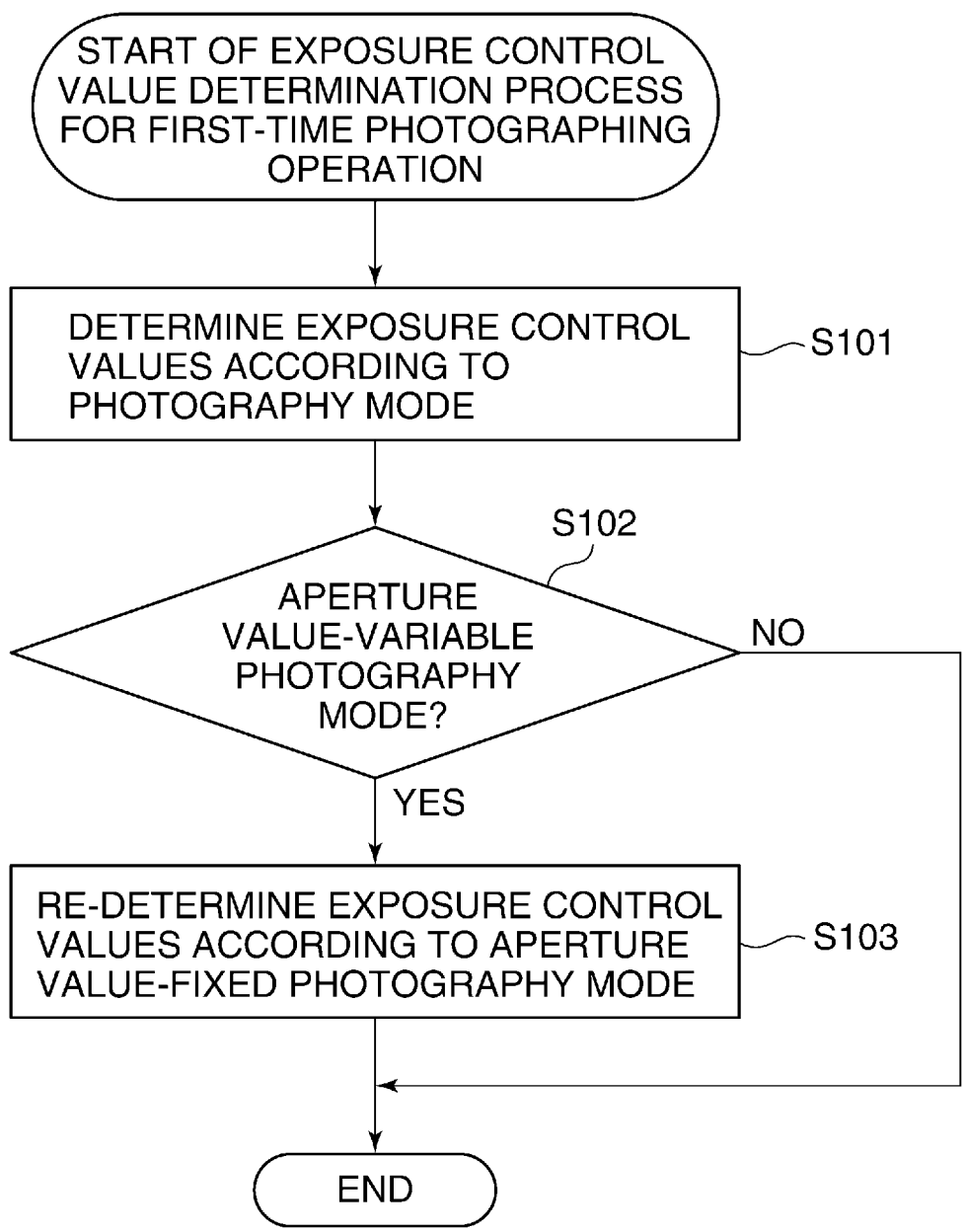
FIG. 8 is a flowchart of an exposure control value determination process performed by a digital camera as an image pickup apparatus according to a second embodiment of the present invention.

FIG. 8 is a flowchart of an exposure control value determination process performed by the camera as the image pickup apparatus according to the second embodiment.

When the exposure control value determination process is started for a first-time photographing operation, the image pickup apparatus controller 104 determines the exposure control values according to a photography mode selected by the photography mode selection section 109 (step S101). Then, the image pickup apparatus controller 104 determines whether or not the selected photography mode is a photography mode in which the aperture value is variable (aperture value-variable photography mode) (step S102). Note that also in the present embodiment, the aperture value is fixed (aperture value-fixed photography mode) in the second-time and subsequent photographing operations for the reason described in the first embodiment.

If the selected photography mode is the aperture value-variable photography mode (YES to the step S102), the image pickup apparatus controller 104 re-determines the exposure control values according to the aperture value-fixed photography mode (step S103). At this time, the image pickup apparatus controller 104 uses the aperture value determined in the step 101. Then, the image pickup apparatus controller 104 terminates the first exposure control value determination process.

If the selected photography mode is not the aperture value-variable photography mode (NO to the step S102), the image pickup apparatus controller 104 terminates the first exposure control value determination process.

Figure 9A:
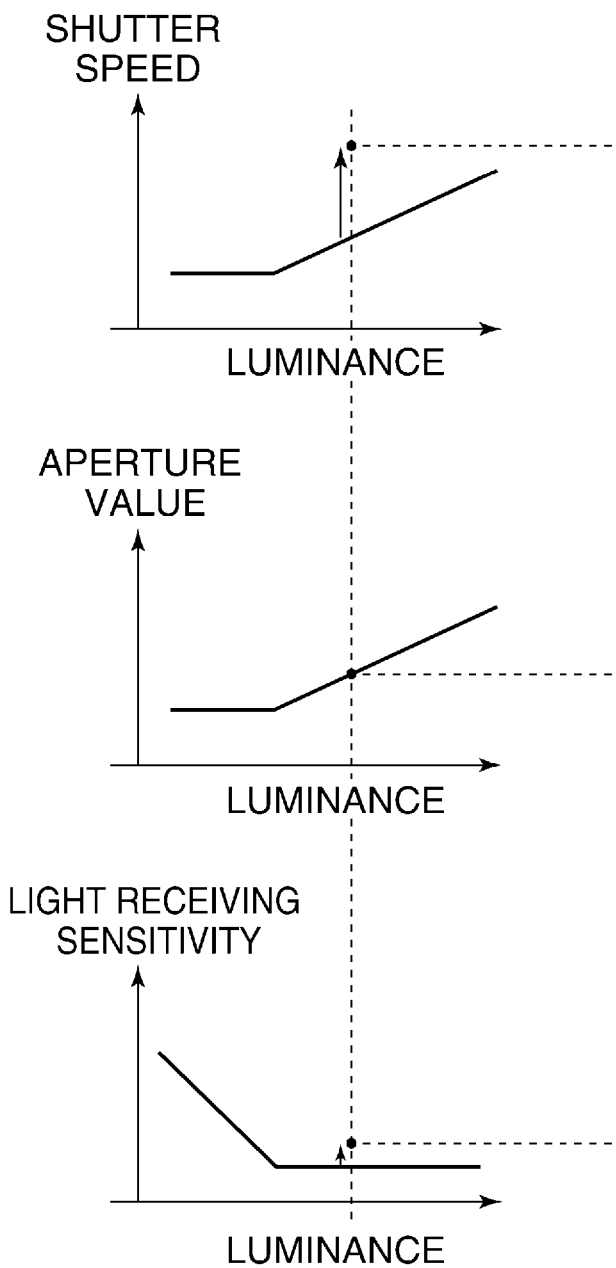
FIGS. 9A and 9B are diagrams showing the exposure control values determined by re-determination processing performed in a step of the exposure control value determination process in FIG. 8.
Figure 9B:
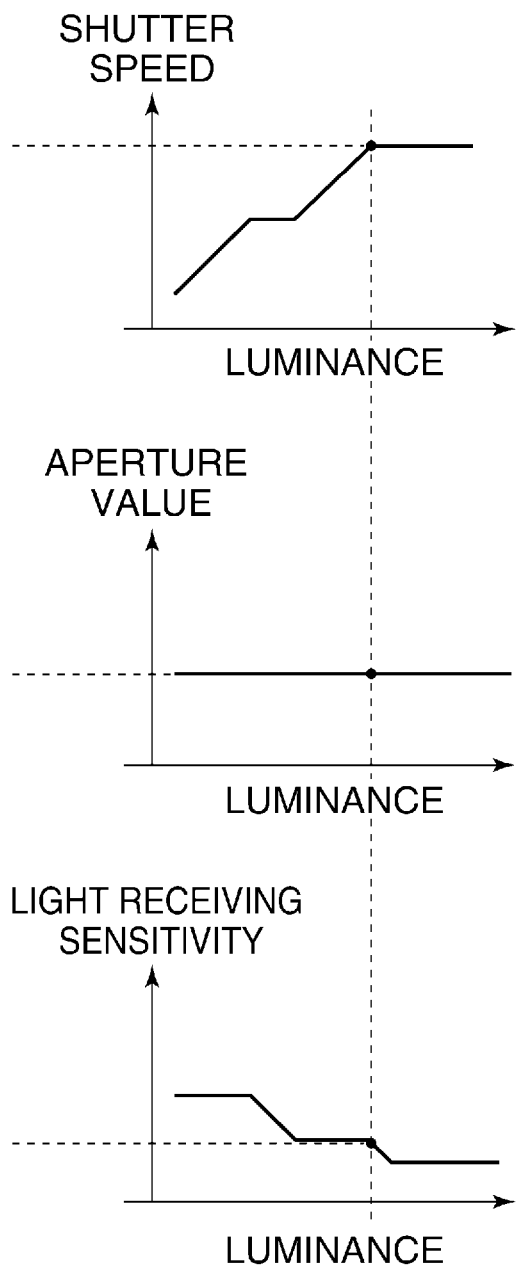

FIGS. 9A and 9B are diagrams showing the exposure control values determined by the re-determination processing performed in the step S103 of the exposure control value determination process in FIG. 8. FIG. 9A shows shifts of the exposure control values in the first-time photographing operation, and FIG. 9B shows the exposure control values determined in the second-time photographing operation in which the aperture value is fixed.

When the exposure control values are re-determined by the re-determination processing in the step S103, the shutter speed and the light receiving sensitivity are shifted as shown in FIG. 9A. As a result, as shown in FIG. 9B, even when the aperture value is fixed in the second-time photographing operation, the shutter speed and the light receiving sensitivity in the second-time photographing operation are identical to those in the first-time photographing operation.

As described above, in the second embodiment of the present invention, when determining the exposure control values in the first-time photographing operation, the exposure control values are re-determined depending on whether or not the photography mode is the aperture value-variable photography mode.

This makes it possible to eliminate differences from the exposure control values in the second-time photographing operation, to thereby maintain the continuity of the moving image, in a state in which the aperture value in a photography mode selected by the photography mode selection section 109 is held.

A description will be given of a camera as an image pickup apparatus according to a third embodiment of the present invention. Note that this camera has the same configuration as that of the camera shown in FIGS. 1 and 2, and hence description thereof is omitted.

In the present embodiment, the description is given of a case where when performing a moving image photographing under a flickering light source, a shutter speed is determined by taking into account a flickering period of the flickering light source, to thereby reduce the influence of brightness/darkness generated by the flickering light source (flicker correction).

In a case where a moving image is photographed under a flickering light source, a shutter speed is preferentially changed, and hence when determining the optimum exposure control values, it is necessary to perform exposure adjustment by the aperture value or the light receiving sensitivity. Further, which to adjust, the aperture value or the light receiving sensitivity, depends on the photography mode.

Figure 10:
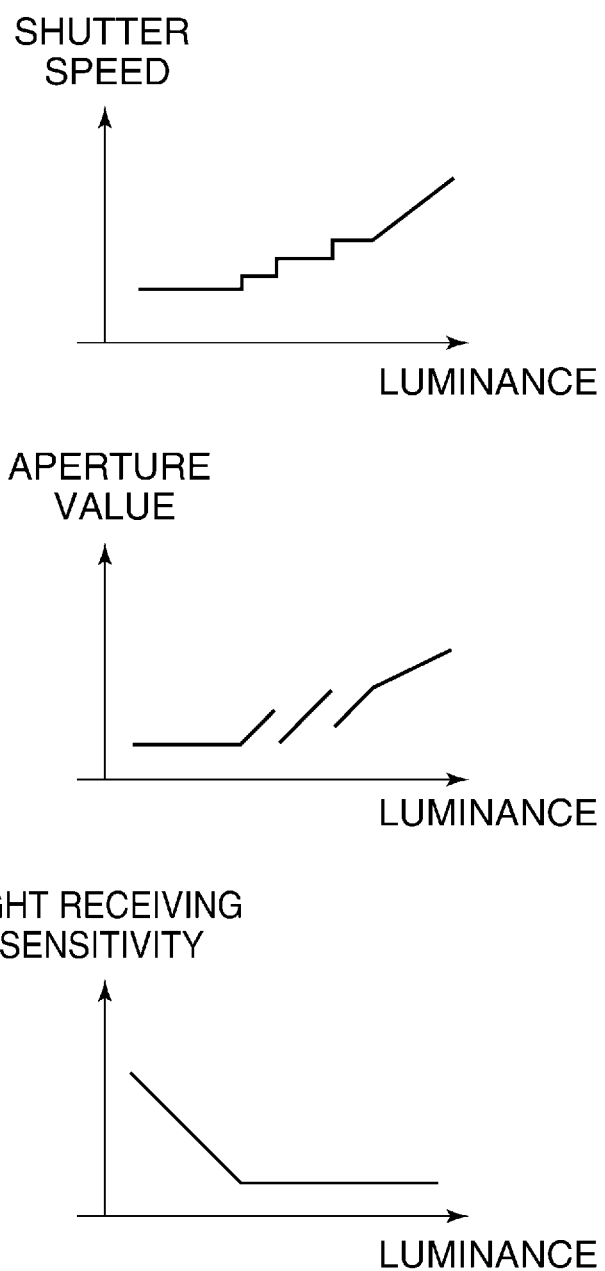
FIG. 10 is a diagram showing an example of the exposure control values determined when flicker correction is performed in an aperture value-variable photography mode.

FIG. 10 is a diagram showing an example of the exposure control values determined when flicker correction is performed in an aperture value-variable photography mode.

In the illustrated example, the exposure adjustment due to flicker correction is performed by holding the light receiving sensitivity at a low level and changing the aperture value, in the aperture value-variable photography mode.

FIG. 11 is a diagram showing another example of the exposure control values determined when flicker correction is performed in an aperture value-fixed photography mode.

In the illustrated example, the exposure adjustment due to flicker correction is performed by fixing the aperture value and changing the light receiving sensitivity, in the aperture value-fixed photography mode.

However, as shown in FIGS. 10 and 11, if the exposure control values are determined as described in the first embodiment when performing flicker correction, the same exposure control values are not necessarily obtained with respect to the same luminance value.

Figure 12A:
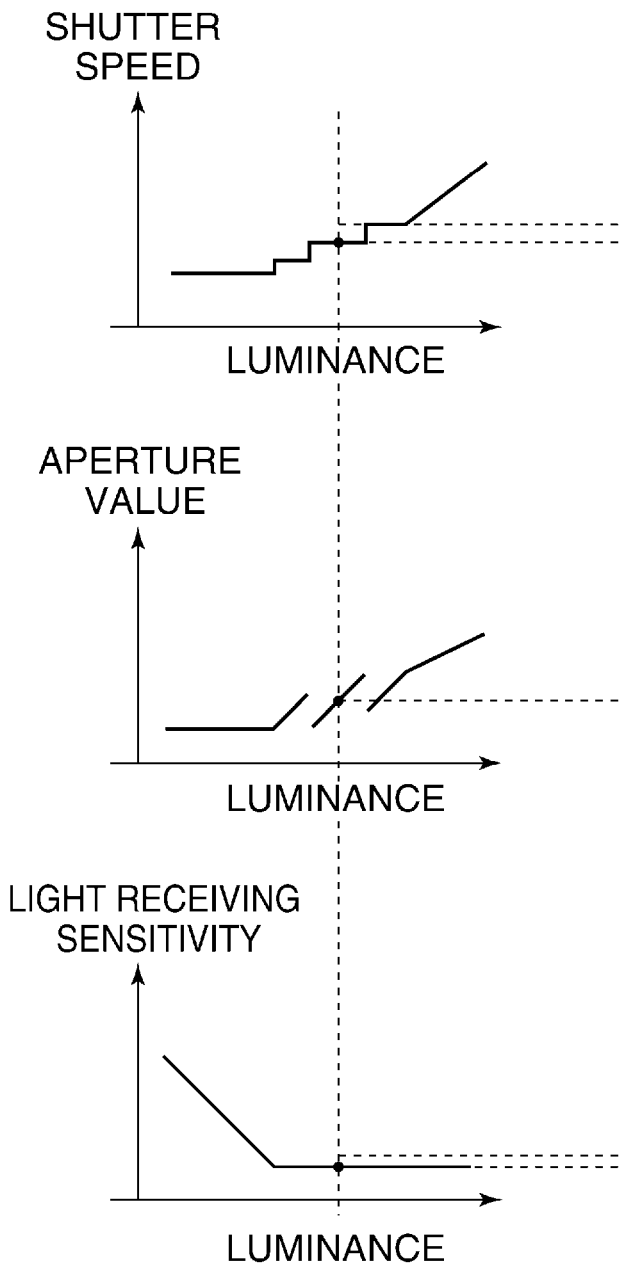
FIGS. 12A and 12B are diagrams useful in explaining another example of the exposure control values determined when the aperture value is made variable in a first-time photographing operation, and is fixed in a second-time photographing operation.
Figure 12B:
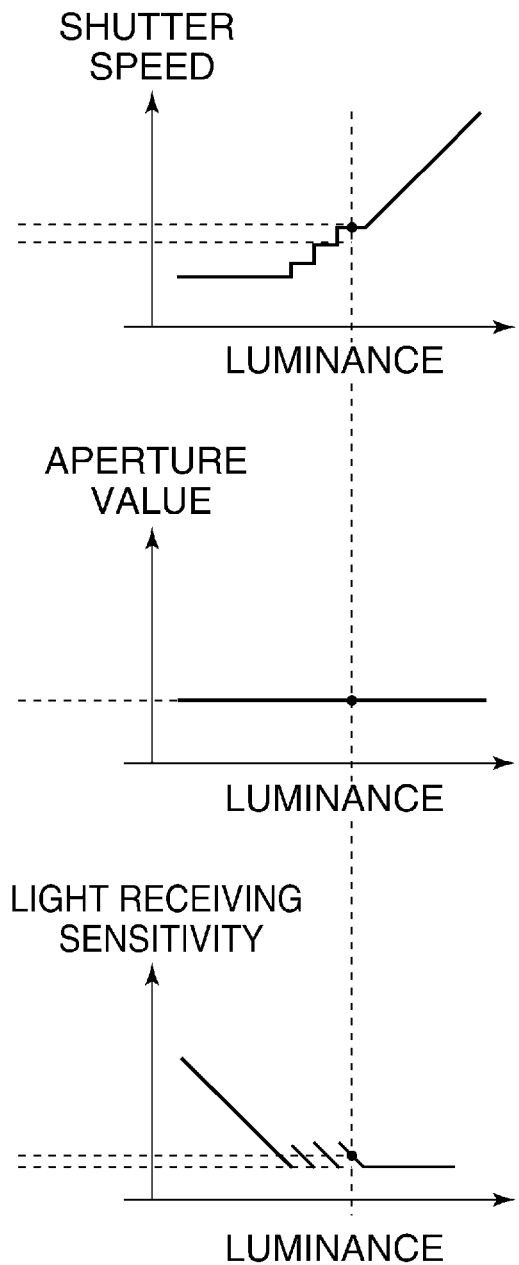

FIGS. 12A and 12B are diagrams useful in explaining another example of the exposure control values determined when the aperture value is made variable in first photographing (e.g. a first-time photographing operation) in a series of photographing operations of time-lapse photography, and is fixed in second photographing (e.g. a second-time photographing operation) after the first photographing in the series of photographing operations of time-lapse photography. FIG. 12A shows the exposure control values determined in the first-time photographing operation, and FIG. 12B shows the exposure control values determined in the second-time photographing operation.

As shown in FIG. 12A, in the first-time photographing operation, the exposure control values are determined by making the aperture value variable, and as shown in FIG. 12B, in the second-time photographing operation, the exposure control values are determined by fixing the aperture value. At this time, even if the luminance value is the same, the exposure control values different between the first and second-time photographing operations are displayed on the display section 103.

Therefore, the continuity of the moving image is lost, and what is wore, a feeling of strangeness is given to the user. To avoid such a situation, in the present embodiment, the exposure control values are determined in the following manner.

Figure 13:
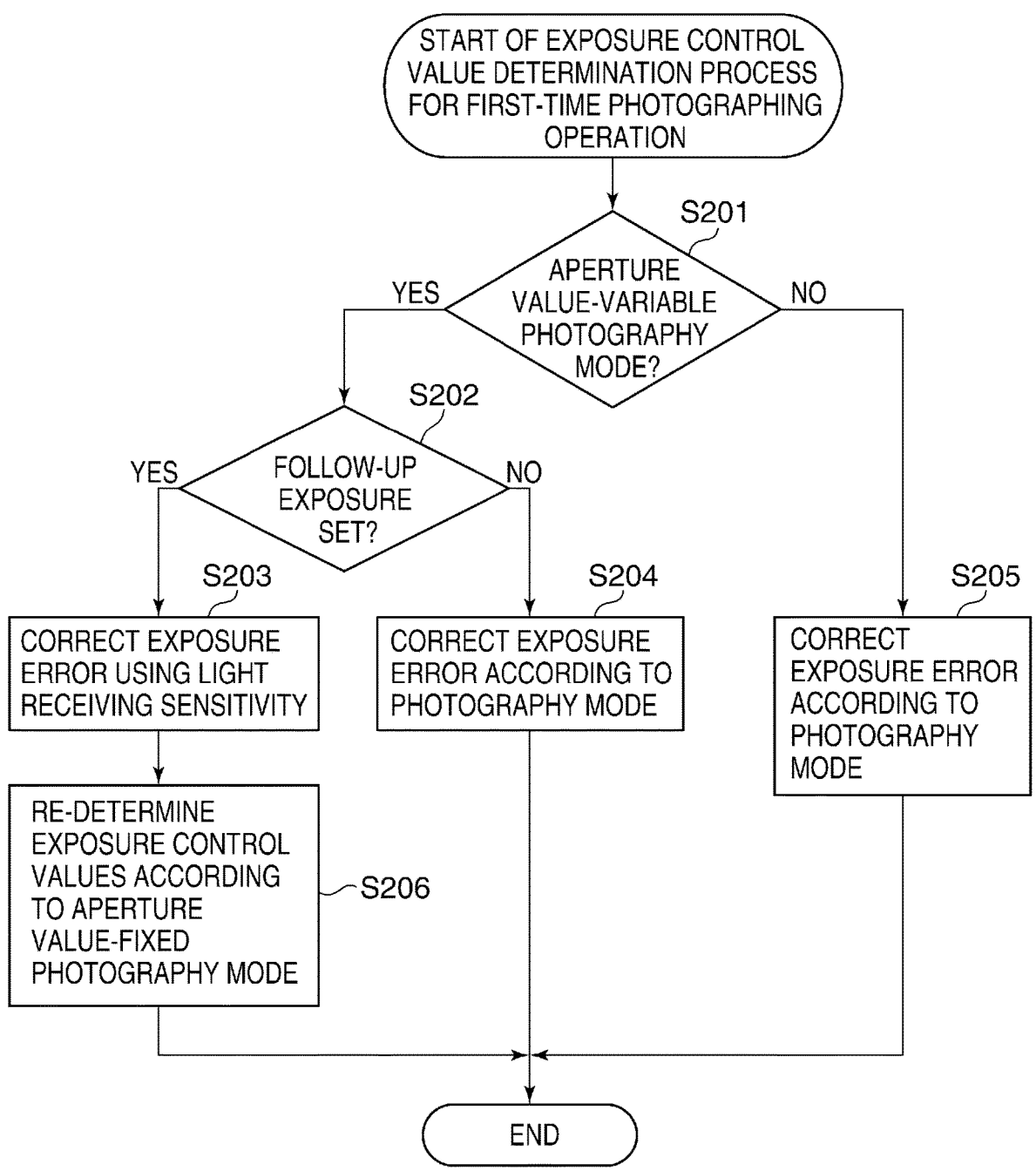
FIG. 13 is a flowchart of an exposure control value determination process performed by a digital camera as an image pickup apparatus according to a third embodiment of the present invention.

FIG. 13 is a flowchart of an exposure control value determination process, performed by the digital camera as the image pickup apparatus according to the third embodiment of the present invention.

When the first exposure control value determination process is started, the image pickup apparatus controller 104 determines whether or not the photography mode selected by the photography mode selection section 109 is the aperture value-variable photography mode (step S201). If the selected photography mode is the aperture value-variable photography mode (YES to the step S201), the image pickup apparatus controller 104 determines whether or not "do follow-up exposure" is set on the setting screen shown in FIG. 3 (step S202).

If "do follow-up exposure" is set (YES to the step S202), the image pickup apparatus controller 104 determines the exposure control values according to the selected photography mode. At this time, the image pickup apparatus controller 104 corrects an exposure error caused by flicker correction using the light receiving sensitivity (photographing sensitivity) regardless of the photography mode (step S203). Then, the image pickup apparatus controller 104 proceeds to a step S206, described hereinafter.

If "not do follow-up exposure" is set (NO to the step S202), the image pickup apparatus controller 104 determines the exposure control values according to the photography mode. At this time, the image pickup apparatus controller 104 corrects an exposure error caused by flicker correction according to the photography mode (step S204).

If the selected photography mode is the aperture value-fixed photography mode (NO to the step S201), the image pickup apparatus controller 104 determines the exposure control values according to the photography mode. At this time, the image pickup apparatus controller 104 corrects an exposure error caused by flicker correction according to the photography mode (step S205). Then, the image pickup apparatus controller 104 terminates the first exposure control value determination process.

In the step S206, the image pickup apparatus controller 104 re-determines the exposure control values using the aperture value determined in the step S203 according to the aperture value-fixed photography mode, as described with reference to FIG. 8. Then, the image pickup apparatus controller 104 terminates the first exposure control value determination process.

Figure 14A:
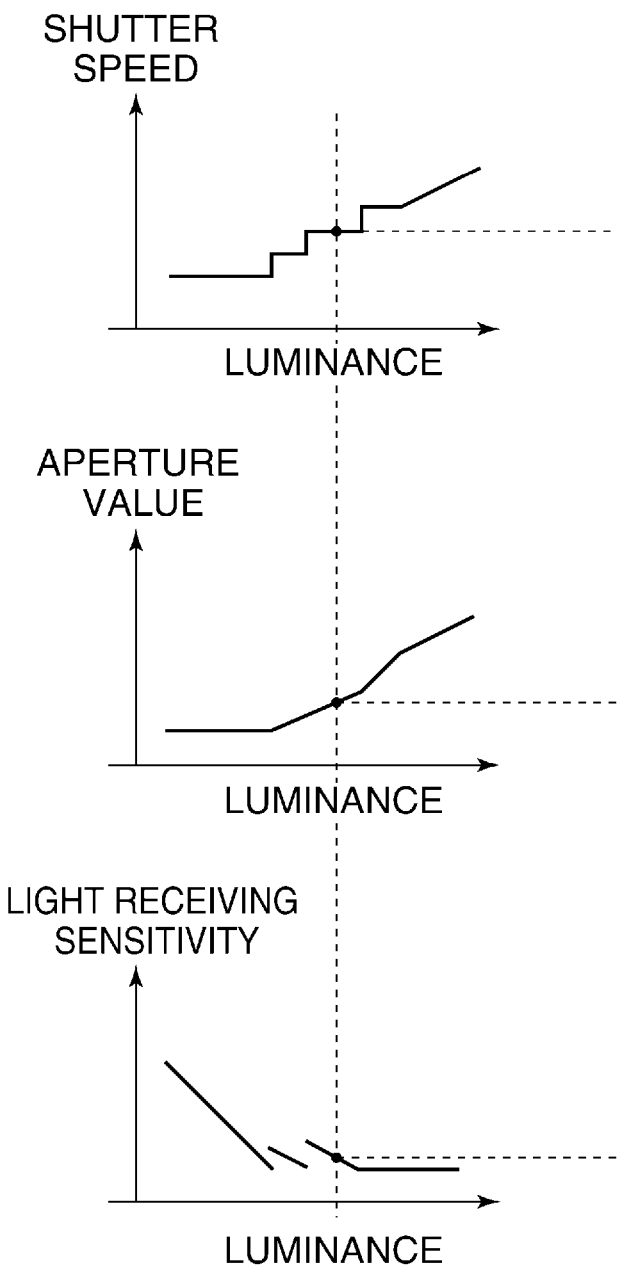
FIGS. 14A and 14B are diagrams useful in explaining changes in exposure control values determined when flicker correction is performed according to a light receiving sensitivity.
Figure 14B:
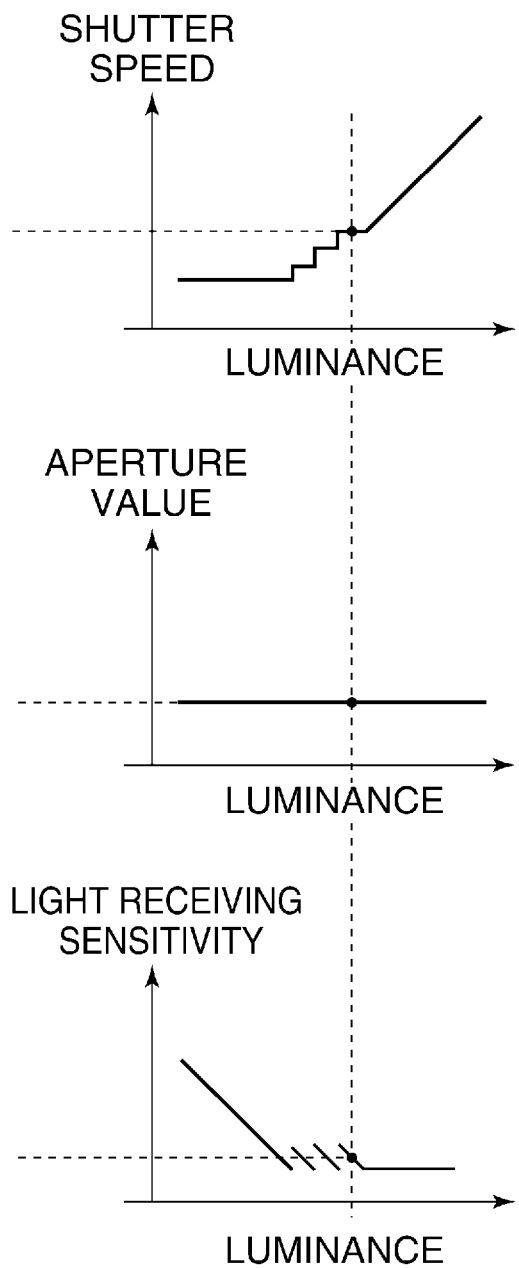

FIGS. 14A and 14B are diagrams useful in explaining changes in exposure control values determined when flicker correction is performed according to the light receiving sensitivity. FIG. 14A shows changes in exposure control values determined when flicker correction is performed using the light receiving sensitivity in a first-time photographing operation, and FIG. 14B shows the exposure control values determined in a second-time photographing operation.

When flicker correction is performed using the light receiving sensitivity in the first-time photographing operation in the step S203, even if the aperture value is fixed in the second-time photographing operation, the same exposure control values are determined in the first and second-time photographing operations insofar as the luminance value is the same.

As described above, in the third embodiment of the present invention, it is possible to perform photographing under a flickering light source without losing the continuity of a moving image, and further without giving the user a feeling of strangeness.

The present invention has been described heretofore based on the embodiments thereof. However, the present invention is not limited to these embodiments, but it is to be understood that the invention includes various forms within the scope of the gist of the present invention.

For example, in the above-described embodiments, any suitable method may be employed as the time-lapse photography method. For example, a method may be employed in which a still image is acquired at predetermined time intervals by intermittently photographing an object using the image pickup device 101, and a time-lapse moving image is generated by sequentially connecting the still images in the acquired order. Further, as another method, a method may be employed, in which a time-lapse moving image is generated by sequentially connecting images which are intermittently extracted at predetermined time intervals from a multiplicity of images acquired at the same frame rate as the normal moving image.

Note that a control method is executed by the image pickup apparatus based on the functions of the above-described embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as 'a non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-089677 filed Apr. 28, 2017, which is hereby incorporated by reference herein in its entirety.

What is claimed is:

1. An image pickup apparatus that can perform time-lapse photography, which includes obtaining a plurality of images by causing an image pickup section to intermittently capture an image of a subject at predetermined time intervals, the image pickup apparatus comprising:
at least one processor to perform,
selecting one of a plurality of photography modes; and
determining exposure control values to be used in photographing performed by the image pickup section, based on a selected photography mode, and performing exposure control according to the determined exposure control values,
wherein the exposure control values include at least an aperture value, a shutter speed, and a photographing sensitivity,
wherein the plurality of photography modes include a first photography mode in which the aperture value is variable based on a brightness of the subject, and a second photography mode in which the aperture value is not variable based on the brightness of the subject, and
wherein in a case of performing the time-lapse photography and the selected photography mode is the first photography mode, the at least one processor determines the exposure control values for a first image capturing of the time-lapse photography so that the exposure control values are determined according to the second photography mode and based on the aperture value that is determined according to the first photography mode, and uses the same aperture value as used in the first image capturing for the exposure control values for a second image capturing after the first image capturing of the time-lapse photography.

2. The image pickup apparatus according to claim 1, wherein in a case where, when performing the time-lapse photography, the selected photography mode is the second photography mode, the at least one processor determines the exposure control values for the first image capturing so that the exposure control values are determined according to the second photography mode and are not determined via the first photography mode.

3. The image pickup apparatus according to claim 1, wherein when performing photographing under a flickering light source, in a case where the selected photography mode is the first photography mode, and also exposure follow-up is performed, the at least one processor determines the exposure control values according to the first photography mode, corrects an exposure error caused by flicker correction using the photographing sensitivity, and further, re-determines the other exposure control values according to a photography mode in which the aperture value is fixed.

4. The image pickup apparatus according to claim 3, wherein in a case where the selected photography mode is the first photography mode, and also the exposure follow-up is not performed, the at least one processor determines the exposure control values according to the first photography mode, and corrects the exposure error caused by the flicker correction according to the exposure control values determined according to the first photography mode.

5. The image pickup apparatus according to claim 3, wherein in a case where the selected photography mode is not the first photography mode, the at least one processor determines the exposure control values according to the first photography mode, and corrects the exposure error caused by the flicker correction according to the exposure control values determined according to the first photography mode.

6. A method of controlling an image pickup apparatus that obtains can perform time-lapse photography, which includes obtaining a plurality of images by causing an image pickup section to intermittently capture an image of a subject at predetermined time intervals, the method comprising:
selecting one of a plurality of photography modes; and
determining exposure control values to be used in photographing performed by the image pickup section, based on a selected photography mode by said selecting, and performing exposure control according to the determined exposure control values, wherein the exposure control values include at least an aperture value, a shutter speed, and a photographing sensitivity, wherein the plurality of photography modes include a first photography mode in which the aperture value is variable based on a brightness of the subject, and a second photography mode in which the aperture value is not variable based on the brightness of the subject, and wherein the exposure control includes, in a case of performing the time-lapse photography and a photography mode selected by said selecting is the first photography mode, determining the exposure control values for a first image capturing of the time-lapse photography so that the exposure control values are determined according to the second photography mode based on the aperture value that is determined according to the first photography mode, and using the same aperture value as used in the first image capturing for the exposure control values for a second image capturing after the first image capturing of the time-lapse photography.

7. A non-transitory computer-readable storage medium storing a computer-executable program for executing a method of controlling an image pickup apparatus that can perform time-lapse photography, which includes obtaining a plurality of images by controlling an image pickup section to intermittently capture an image of a subject at predetermined time intervals, wherein the method comprises:

selecting one of a plurality of photography modes; and determining exposure control values to be used in photographing performed by the image pickup section, based on a selected photography mode by said selecting, and performing exposure control according to the determined exposure control values, wherein the exposure control values include at least an aperture value, a shutter speed, and a photographing sensitivity, wherein the plurality of photography modes include a first photography mode in which the aperture value is variable based on a brightness of the subject, and a second photography mode in which the aperture value is not variable based on the brightness of the subject, and wherein the exposure control includes, in a case of performing the time-lapse photography and a photography mode selected by said selecting is the first photography mode, determining the exposure control values for a first image capturing of the time-lapse photography so that the exposure control values are determined according to the second photography mode based on the aperture value that is determined according to the first photography mode, and using the same aperture value as used in the first image capturing for the exposure control values for a second image capturing after the first image capturing of the time-lapse photography.

* * * * *